May 3, 1966 L. W. GILLETTE 3,249,112
CHECK FILE GUIDES
Filed May 15, 1963 2 Sheets-Sheet 1

INVENTOR.
La Vergne W. Gillette,
BY Parker & Carter
Attorneys.

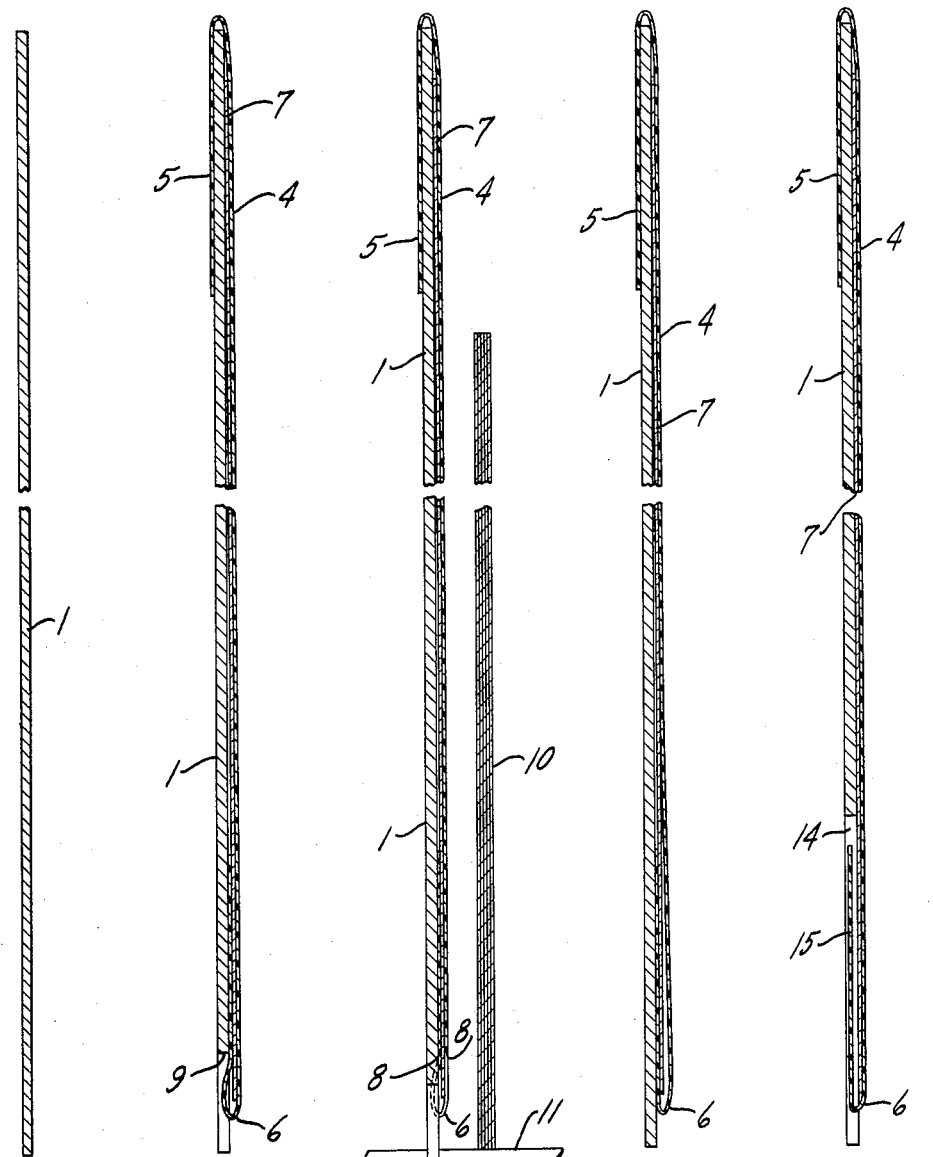

United States Patent Office 3,249,112
Patented May 3, 1966

3,249,112
CHECK FILE GUIDES
Lavergne W. Gillette, Grand Ledge, Mich., assignor to Shaw-Walker Co., Muskegon, Mich., a corporation of Michigan
Filed May 15, 1963, Ser. No. 280,532
1 Claim. (Cl. 129—16.7)

This invention relates to improvements in check file guides and has for one object to provide a check file guide which is so thin that it in effect substantially increases the capacity of the conventional filing tray.

Another object is to provide a check file guide of minimum thickness whereby an increased number of guides may be placed in the conventional filing tray.

In a bank, the process of filing depositors checks after they have been paid, prior to returning them to depositors with their respective monthly statements involves comparison of check signatures to their related authorized signature cards.

Filing the signature card, which is a contract, with the check file index guide for the same account provides means for a convenient operation of verifying the validity of the check, and then merely dropping the check into the file tray.

There are many designs of check file guides with plastic pockets to hold and protect signature cards. Such check file guides should be as thin as practicable to save filing space, and also must permit reference to reverse side of signature card when desired. The guide must also permit easy removal of a closed account signature card so the guide may be reused by putting a new signature card in the pocket for a new account.

Other objects will appear from time to time throughout the specification and claim.

The invention is illustrated more or less diagrammatically in the accompanying drawings, wherein:

FIGURE 2 is a section along the line 2—2 of FIGURE 1;

FIGURE 3 is a section along the line 3—3 of FIGURE 1;

FIGURE 4 is a section along the line 4—4 of FIGURE 1;

FIGURE 5 is a similar section showing the heretofore used type of check file guide;

FIGURE 7 is a section along the line 7—7 of FIGURE 6.

Like parts are indicated by like characters throughout the specification and drawings.

Figure 1:
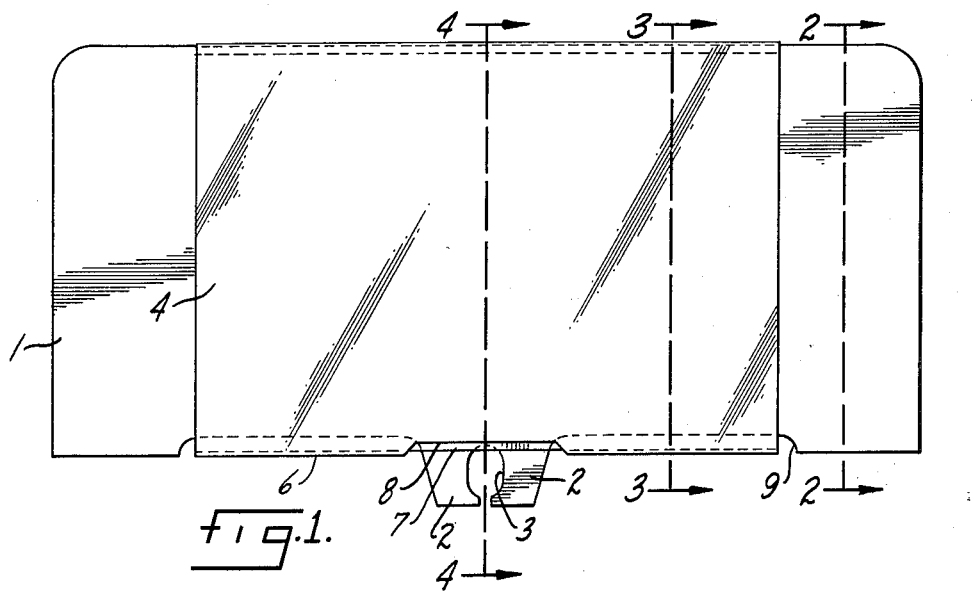
FIGURE 1 is a plan view of the check file guide incorporating the invention.

The check file guide includes a flat stiff board 1. The height from top to bottom may be, for example, four inches. Depending downwardly from the board is a pair of notched prongs 2 defining an aperture 3 which may receive a retaining rod to hold the guide in a filing tray. A transparent envelope 4 is made of flexible transparent material folded over the top of the check file guide and cemented to the back thereof at 5. It extends downwardly along the front of the file guide and terminates just short of the bottom thereof. This envelope or pocket is folded back upon itself at 6 to receive a paper which may be a signature card 7. It will be noted that where the pocket is folded back on itself, it is thicker than twice the flat thickness of the envelope material. It must be so made because if the fold is reduced to exactly double the thickness, it may crack or break.

Conventionally these envelopes lay flat against the file guides or boards and thus substantially increase the total thickness of the assembly or assemblies. It is to avoid this objectional feature that this invention has been made. The fold back is cut away at 8 eliminating the rolled edge for that portion of the guide which conforms to the members 2. The file guide itself on both sides of the members 2 is cut away as at 9, away from the thickened rolled portion. The filed checks 10 used with the check file guide rest preferably upon the diagrammatically illustrated floor 11 of a file tray. The fingers 2 extend into the usual longitudinal channel in the file tray and the check file guide, like the checks, thus rest on the floor. The upper edges of the checks it will be noted terminate short of the cemented portion 5 of the pocket.

In FIGURE 5, I have illustrated on an enlarged scale the increased thickness of the check file guide inevitable when the conventional type is used.

The envelope or pocket must be folded back upon itself in front of the check file guide, otherwise it will not hold the identifying card or paper the envelope or pocket is intended to hold. The envelope where it is folded back along the upper edge of the check file guide and cemented thereto does not increase its thickness in the area of the filed checks.

Referring to FIGURE 5, it will be noted that the envelope 6 is folded back upon itself to enclose the signature card 7 and the bulge at the fold is presented directly to the check file guide 1 and as a result the total thickness of the envelope, the turn back portion, and the check file guide at the bulge is substantially greater than the sum of the four thicknesses.

Figure 6:
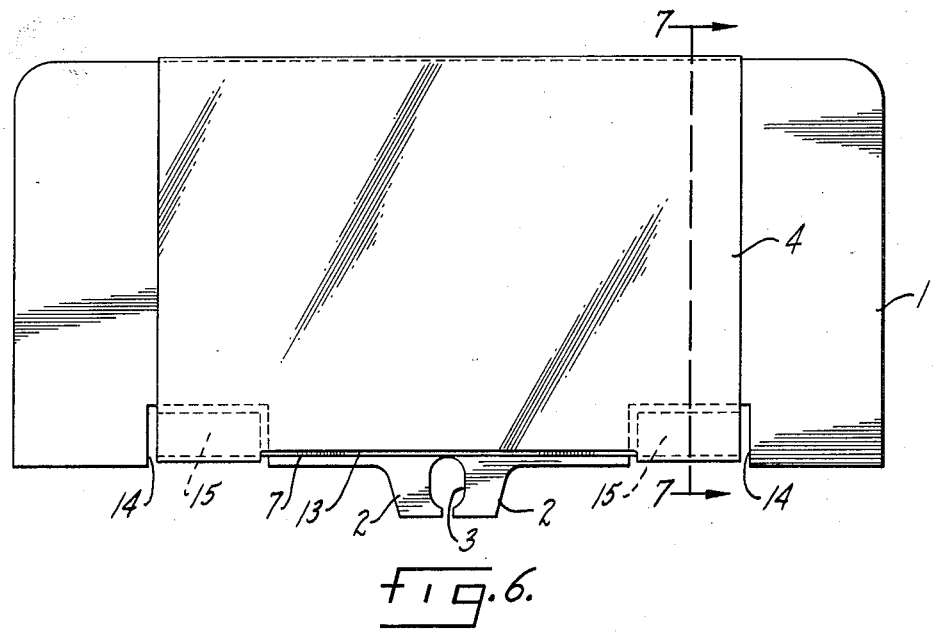
FIGURE 6 is a plan view of a check file guide of a variant form.

In the modified form shown in FIGURES 6 and 7, the bulge or curved portion is cut away as at 13 in the general area adjacent the prongs or fingers 2 where it is in line with the check file guide 1 and the check file guide itself is cut away as at 14 adjacent the shortened portion of the folded back envelope 15.

The use and operation of the invention are as follows:

Check file guides are approximately four inches high, so the transparent pocket for a four by six inch signature card must be substantially the same height as the check file guide to which it is attached.

The disadvantage of the old type of file guide as shown in FIGURE 5 is the amount of filing space it occupies, due to the looped bottom fold of the pocket which bulges out more than is required to hold the signature card. In commercially produced pockets there is considerable variation in the bottom fold radius which must hold cards from .006 to .015 inch thickness.

Because there is a check file guide for every checking account, and there may be comparatively few checks each month for each account, it may be possible to have as many as two hundred file guides in each twenty-four inch file tray.

The thickness of one old type file guide is .051 inch at the bottom. One thousand such file guides occupy fifty-one filing inches not including the checks to be filed. Two hundred file guides in one file tray occupy ten and one-fifth filing inches, or forty percent of the twenty-four inch file tray capacity.

The improved file guide reduces thickness where it saves file space, as shown by the drawings.

In one form the center portion of the pocket bottom fold is notched out about one and five-eighths inches wide. Portions of the file guide bottom edge, left and right of center, are notched high enough to clear the bulge of pocket bottom fold. In this case, the greatest thickness of the file guide (in area occupied by checks) is .039 inch instead of .051 inch. Two hundred file guides in a tray occupy only seven and eight-tenths inches; a saving of two and four-tenths inches. Saving two and four-tenths inches filing space in a twenty-four inch tray is ten percent. In a bank with twenty-five thousand checking accounts, a ten percent saving could amount to one thousand dollars in equipment cost and a proportionate floor space saving.

I claim:

In combination, a stiff file guide having a tab extending downwardly from its lower edge, a transparent sheet folded over the top edge, adhered to the back of the file guide and extending downwardly along the front thereof, the lower edge of the sheet terminating in a looped bottom pocket fold, adjacent but above the lower edge of the file guide, the folded portion being loose between the sheet and the file guide, the radius of the fold being such that a bulge is formed, the thickness of which is more than twice the thickness of the sheet, the fold being cut away in register with and on both sides beyond the tab, the bottom of the file guide being cut away on both sides of the tab in register with the bulge.

References Cited by the Examiner

UNITED STATES PATENTS

| | | | |
|---|---|---|---|
| 871,102 | 11/1907 | Blaine | 129—16.7 X |
| 1,742,993 | 1/1930 | Jettinger | 129—16.7 |
| 2,432,493 | 12/1947 | Addington | 129—16.8 |
| 2,843,955 | 7/1958 | Engelstein | 129—20 X |
| 2,952,087 | 9/1960 | Chamberlin | 40—159 X |

FOREIGN PATENTS 293,133  12/1953  Switzerland.

JEROME SCHNALL, *Primary Examiner.*